United States Patent [19]

Kennedy

[11] 4,139,741
[45] Feb. 13, 1979

[54] PHONE GUARD FOR LOCKING OUT LONG-DISTANCE CALLS

[76] Inventor: Austin R. Q. Kennedy, 4532 W. 17th St., Los Angeles, Calif. 90019

[21] Appl. No.: 870,450

[22] Filed: Jan. 18, 1978

[51] Int. Cl.² ............................................. H04M 1/66
[52] U.S. Cl. .............................. 179/90 D; 179/189 D; 179/18 DA
[58] Field of Search ............ 179/90 D, 189 D, 189 R, 179/18 DA

[56] References Cited

U.S. PATENT DOCUMENTS

| | | | |
|---|---|---|---|
| 3,358,087 | 12/1967 | Von Stein | 179/90 D |
| 3,511,939 | 5/1970 | Aikawa | 179/90 D |
| 3,727,009 | 4/1973 | Ireland | 179/189 D |
| 3,832,497 | 8/1974 | Vogt | 179/90 D |
| 3,937,900 | 2/1976 | Nagakura | 179/189 D |
| 3,973,083 | 8/1976 | Sekiguchi | 179/90 D |
| 4,000,380 | 12/1976 | Jackson | 179/90 D |
| 4,012,602 | 3/1977 | Jackson | 179/90 D |
| 4,020,295 | 4/1977 | Vuotto | 179/90 D |

Primary Examiner—Thomas W. Brown
Assistant Examiner—Gerald L. Brigance

[57] ABSTRACT

A telephone lock for attachment to a telephone permits a user to dial local calls only with a first predetermined number of digits. Upon lifting a receiver/speaker from a cradle connected to the telephone lock, a counting device counts the first number of digits. A ratchet wheel rotatably mounted on the lock is advanced from an initial position by a first preset angle against the action of a spring by a ratchet wheel advancement device, following dialing of one of the predetermined number of digits. A first dialing stop device restrains the user from dialing at least one of the digits on a dialing device for reaching the operator on an initial dialing, and a second dialing device restrains the user from dialing an additional number of digits, when the ratchet wheel has advanced from the initial position by a second preset angle. When the receiver/speaker has been replaced on the cradle, the dialing device is reset to a starting position.

11 Claims, 15 Drawing Figures

PHONE GUARD FOR LOCKING OUT LONG-DISTANCE CALLS

BACKGROUND OF THE INVENTION

There is known a coin telephone, and more particularly a combination pay and general subscriber telephone set from U.S. Pat. No. 3,511,939, which is capable of operating either as a pay station, or upon insertion and operation of a key, as a general subscriber set.

A combination pay and general subscriber telephone service is provided, which has sensing means operatively associated with the dial assembly to sense dialing of a prohibited digit in a particular sequential place within a telephone number. Additionally the set is provided with key operative means which are connected to the circuit and, upon operation of the key, switch the circuit to a regular subscriber telephone circuit, and prevent disabling of the connection of the set to the telephone line, regardless of the number being dialed. A dial has a cam associated therewith which is positioned to have a predetermined relation with respect to the position of the prohibited digit on the dial.

The U.S. Pat. No. 3,727,009, there is also known a telephone security device which is intended to prevent unauthorized use of the distant-direct-dialing facility on dial-type telephones. It makes use of a mechanism which is stepped by operation of the dial to call a digit, and which after a predetermined number of digits has been called, locks the dialing mechanism to prevent further dialing. The predetermined number is so selected, as to prevent the desired misuse of the telephone.

From U.S. Pat. No. 3,832,497 there is also known a telephone long distance attachment to be attached to a standard telephone on the outside housing thereof, without in any way dismantling the telephone, for preventing long distance calls, and at the same time facilitating local calls in which a first ratchet mechanism limits the number of dialed digits to those required for a local call only. A second ratchet mechanism prevents dialing the operator on the first dial, and a third ratchet mechanism prevents the release of the telephone buttons before they are fully pressed, to prevent dialing by depressing the buttons.

From U.S. Pat. No. 3,748,402 there is also known an apparatus for preventing the dialing of toll call telephone numbers using a public utility rotary dial telephone. The apparatus permits local telephone calls to be completed, and can be disabled to permit toll calls by a local call pay telephone.

There is also known from U.S. Pat. No. 4,022,992, a telephone lock for attachment to a telephone which permits the user to dial local calls only with a first predetermined number of digits, where one of the digits is assigned to call an operator. In this telephone lock, which has been invented by the inventor of the present invention, the telephone receiver normally rests upon a set of depressable push-buttons for making contact with the push-buttons of the telephone itself. A lock dial device is connected to the telephone dialing device, so that the user can dial a selected number of the digits sequentially when the telephone receiver and speaker have been lifted from the set of push-buttons. First and second dialing stop-devices prevent the user from dialing the digit assigned to the operator, and from dialing an additional number of digits after he has dialed the first number of digits, respectively. A counting device for counting the first number of digits, includes a shaft, a gear rotatable on the latter, and formed with a plurality of substantially equispaced longitudinal fingers; one of the fingers is an elongated finger. The torsion spring urges the gear to move in one direction, and the gear may be advanced an angular step equal to the spacing between adjacent fingers, when dialing one of the digits. The second dialing stop-device stops the advancement of the gear, when a bar attached to the lock's housing impinges on the elongated finger. When the receiver/speaker has been replaced on the set of push-buttons, the dialing device is reset to an initial state.

All of the above inventions are relatively complicated devices, which have a relatively large number of parts, and cannot easily be manufactured at low cost.

SUMMARY OF THE INVENTION

It is accordingly an object of the present invention to devise a relatively inexpensive phone guard or phone lock which, uses a minimal number of parts, and still permits the user to make low-cost local calls, but prevents him from making relatively costly long-distance calls, either by dialing such calls directly, or through placing them through an operator.

I accordingly provide a telephone lock which may be attached to the telephone; the telephone has first dialing means, and the dialing means have an initial position for dialing a multiplicity of digits and an operatively handheld receiver and speaker. The lock permits a user to dial local calls only, and the local calls may be dialed with a first predetermined number of digits. At least one of the digits is assigned for calling an operator. The lock includes a housing, support means which may be moved from a standby position to an operative position, and which are connected to the housing for the receiver and speaker to rest upon in the standby position. I provide second dialing means which have an initial state, and are connected to the first dialing means for enabling a user to dial a selected number of digits sequentially, when the receiver and speaker have been lifted from the support means. The second dialing means include a ratchet wheel which is rotatably mounted on the housing, an elongated arm extending radially from the ratchet wheel. First dialing stop-means restrain the user from dialing at least one of the digits on the second dialing means for reaching the operator at least on an initial dialing. Counting means are provided for counting the first number of digits, and include a cam rigidly secured to the first dialing means, including ratched wheel advancement means, which cooperate with the ratchet wheel, and spring means secured with one end thereof to the housing, and with its other end to the ratchet wheel for urging the ratchet wheel to move in one direction; the ratchet wheel may be advanced from the initial position against the action of the spring-means by a first preset angle by the ratchet wheel advancement means, following dialing of one of the predetermined number of digits. Second dialing stop-means are provided for restraining the user from dialing an additional number of digits beyond the predetermined number of digits, when the ratchet wheel has advanced from the initial position by a second preset angle, and the multiple of the first preset angle corresponds to the first predetermined number of digits. Resetting means are provided for resetting the second dialing means to the initial state upon the receiver and speaker having been replaced on the support means.

The ratchet wheel advancement means is movable from a normal occupied first position to a second position and includes a resilient elongated member secured to the cam; the resilient elongated member may be bent in a predetermined direction, when coming in contact with at least a portion of the ratchet wheel upon the dialing means executing a motion by a first predetermined angle in a direction opposite to the predetermined direction to the second position, and is adapted to snap back to the first position upon the dialing means having moved by a second predetermined angle in the direction opposite to the predetermined direction beyond the first predetermined angle. The telephone lock preferably includes lock means which have locked and unlocked positions for locking and unlocking the housing to and from the telephone, respectively; long distance calls and local calls may then be dialed from the lock-attached telephone in the unlocked and locked positions, respectively.

The operator may be called by initially dialing the digit zero, and the first dialing stop means includes zero-dialing stop means which have an initial position for restraining the digit zero on the initial dialing, and release means for setting the zero-dialing stop means to an inoperative position.

The resetting means include a stop disposed on the ratchet wheel, and pivotable means which may be operated by the support means, and connected to the housing for operatively making contact with the stop, and for restraining the ratchet wheel for motion beyond a preset angle in a direction urged on the ratchet wheel by the spring means, when the receiver and speaker have been placed on the support means, so that the resetting means is reset to the initial state.

The second dialing stop means includes last digit stop means disposed on the cam for abuting the stop disposed on the ratchet wheel, when the ratchet wheel has been advanced from the initial position by the preset angle, so as to restrain the user from dialing the additional number of digits.

The pivotable means preferably engage the ratchet wheel, so as to restrain the latter to move in a direction opposite to the direction urged upon the ratchet wheel by the spring means, when the lock means is in the lock position; the lock means cooperates with pivot means for disengaging the pivot means from the ratchet wheel, when the lock means is in the unlocked position.

The first dialing means preferably includes first operating stop means rigid with the ratchet wheel, and the cam includes second operator stop means secured thereto for the second operator stop means to abut the first operator stop means, so as to restrain the user form dialing at least one of the digits.

The support means preferably includes a cradle, and the pivotable means preferably includes a pawl; the cradle, the pawl, the housing, the cam, the stop and the operator stop means are preferably made of synthetic plastic material, the resilient elongated member is preferably made of synthetic resilient plastic material, and all springs are preferably made of metal.

BRIEF DESCRIPTION OF THE DRAWINGS

My invention will be better understood in conjunction with the accompanying drawings, wherein.

DESCRIPTION OF THE PREFFERED EMBODIMENTS

Figure 1:
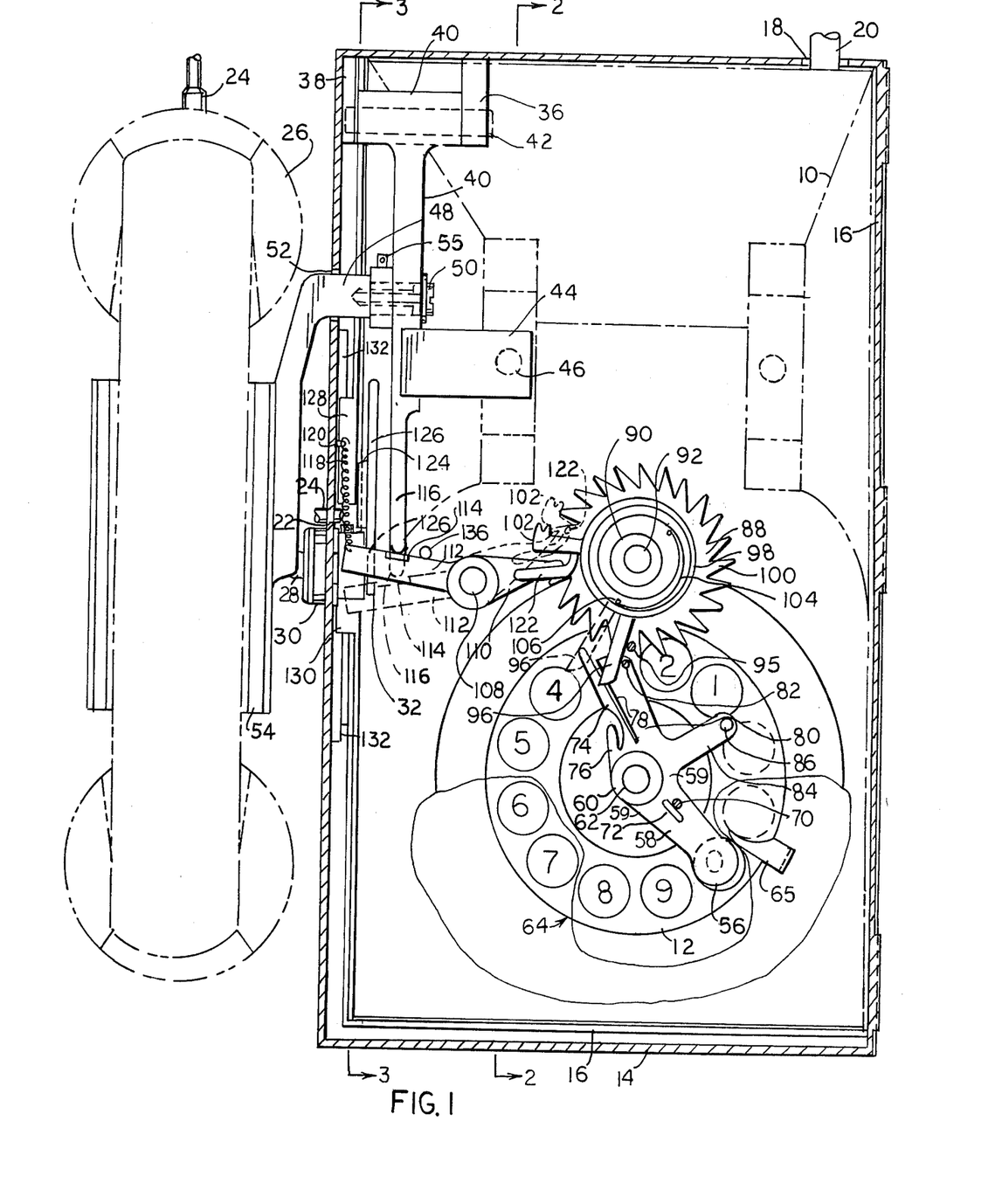
FIG. 1 shows an exploded plan view of the telephone lock, according to my invention, the top cover having been removed for clarity, the ratchet wheel and the dialing means being shown in a plane substantially parallel to the plane of the bottom of the housing for a better understanding of the invention, the view including a cam and a ratchet advancement device.
Figure 2:
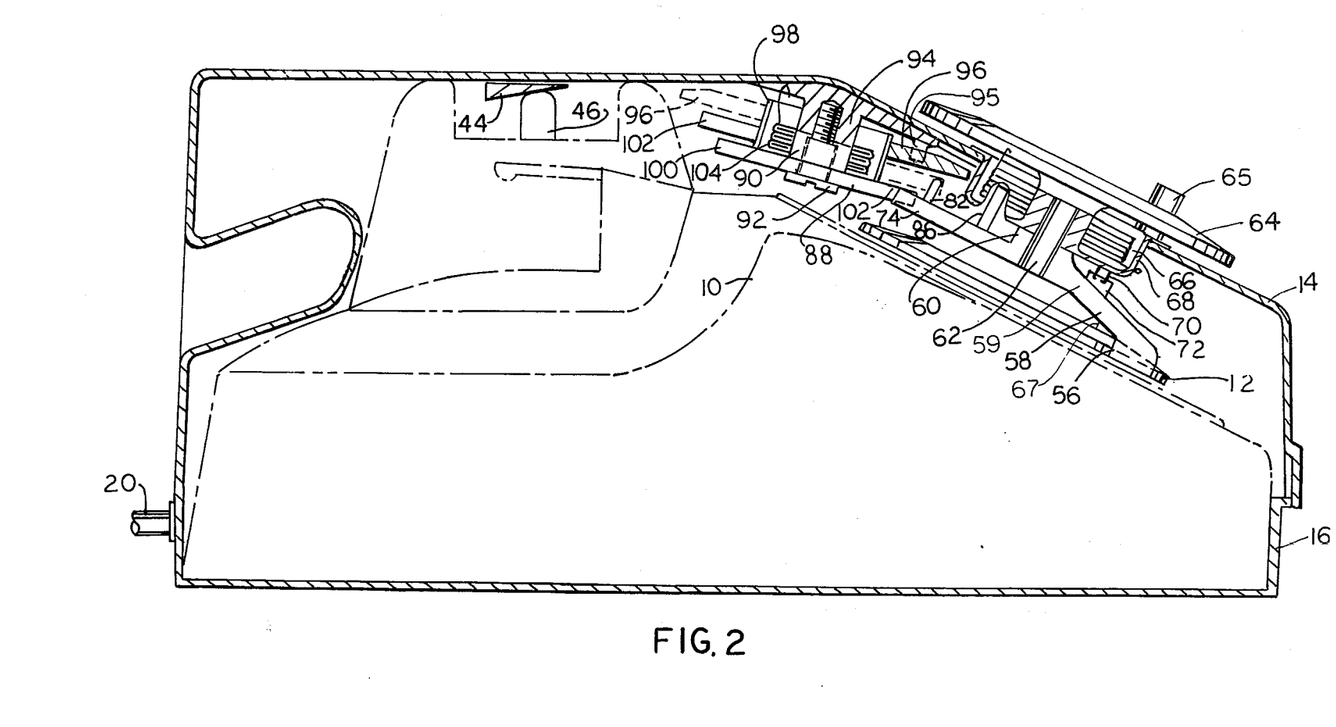
FIG. 2 shows a sectioned view substantially along the line 2—2 of FIG. 1, the ratchet wheel and the second dialing means being, however, shown in their two respective planes.
Figure 3:
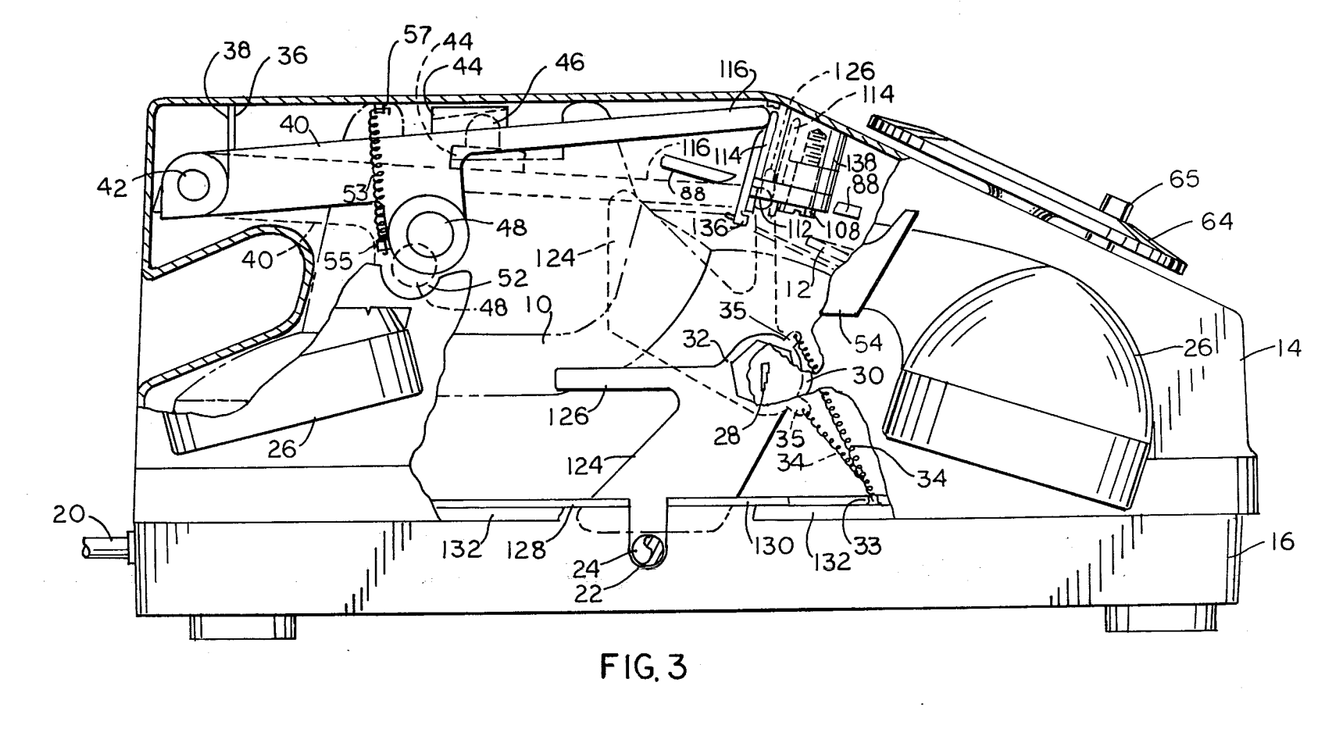
FIG. 3 corresponds to FIG. 2 but is shown along the line 3—3 of FIG. 1.

Referring now to FIGS. 1 through 6, the construction of the phone lock adapted for a conventional rotary dial phone will be described. A conventional phone 10 having a rotary dial 12 will be seen to be fitted within a housing 14 and a bottom tray 16, the housing 14 and bottom tray 16 containing a phone lock to be described later; the phone lock is therefore completely enclosed by the housing 14 containing the phone lock. A slot 18 in the rear of the housing tray 16 permits a telephone cord 20 of the phone 10 to extend outwardly for connecting it to an external telephone network. A slot 22 formed in the left side of the housing tray 16, as seen in FIG. 1, permits a phone cord 24 of the phone 10 to be extended outwardly from the phone lock, the cord 24 is connected to a conventional receiver-speaker 26 at one end thereof. Upon turning a key 28 disposed in a lock 30 of the phone lock counterclockwise, as best seen in FIG. 3, i.e. locking the phone 10 to the phone lock, a substantially L-shaped plate 32 rigidly secured to the lock 30 swings from an unlocked position shown dotted in FIG. 3, to a locked position displaced by about 90° therefrom and shown in full lines; the L-shaped plate 32 is held in the unlocked position by a spring 34, which has one end connected to a lug 35 of the L-shaped plate 32, and its other end connected to the housing 14 in an opening of a lug 33 thereof.

Two support bars 36 an 38 are arranged in the rear upper interior of the housing 14 as shown in FIGS. 1 and FIG. 3. A lever or arm 40 is pivotable about a shaft 42 is supported by the bars 36 and 38, and secured to the housing 14. An arm 44 extends to the right from the lever 40, from about the midpoint of, and along the arm 40, as seen in FIG. 1, and may be made to rest on a depressable push button 46 of the phone 10; the arm 40 may be pivoted about a shaft 42 journaled in the housing 14. Extending from about the same point from the arm 40, but to the left thereof, as seen in FIG. 1, is another arm 48 held rigid with the arm 40 by a screw 50. The arm 48 passes through an elongated vertical slot 52 in the side of housing 14, and is secured to a support of cradle 54 for the receiver-speaker 26. A spring 53, as best seen in FIG. 3, has one end connected to the arm 48 through an opening in a lug 55 thereof, and its other end connected to the underside of the top cover of the housing 14 through an opening 57 therein, to urge the arm 40 to move upwardly in a counter-clockwise direction, when the receiver-speaker 26 is lifted up from the cradle 54.

Figure 13:
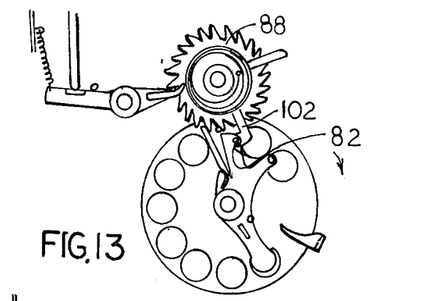

The dial disc 12 of the conventional rotary-dial phone 10 is connected through a cam 59, having a knob or protrusion 56, best seen in FIG. 2, inserted into the "zero" digit opening of the dial disc 12, the knob 56 projecting from the underside of an arm 58 on the hub of 60 of the cam 59. The hub 60 is in turn rigidly press-fitted to a shaft 62, the shaft 62 being secured to the center of a second dial disc 64 of the phone lock 14, best seen in FIGS. 2 and 3. A torsion spring 66 is connected with one of its ends to the second dial disc 64, and with its other end to one side of a spring container holder 68, the holder 68 being part of the housing 14. The dial disc 64 includes a second finger stop 64 rigidly secured to the housing 14 for restraining the user from dialing clockwise beyond a selected digit, when the user's finger has been inserted in the associated opening provided in the dial disc 64. When the spring 66 is wound in a clockwise direction as, for example, when dialing by means of the dialing disc 64 in a clockwise rotation, the spring 66 urges the dial disc 64 to return to an initial position. This is accomplished by the counterclockwise urging of the torsion spring 66 to return a stop 72 disposed on the arm 58 of the cam 59 in a direction towards a stop rod 70 projecting downwards from the underside of the spring retainer holder 68, as best seen in FIGS. 1 and 2. The stop rod 70 prevents an arm 58 of the cam 59 and the dial disc 64 from overshooting the initial position. A thin arm 74 projects from the hub 60 of the cam 59 in a direction angularly displaced by about 180° from the arm 58 on the hub 60, and due to having a relatively reduced cross-section in the vicinity of the hub 60 is resiliently flexible in the plane of FIG. 1. When a free extremity of the arm 74 is pushed in a counterclockwise direction, it will at first bend at its reduced cross-section in the plane of FIG. 1, when moving in that direction, around a stop 76 integral with the hub 60 of the cam 59, and then snap back to its initial unstressed position in a clockwise direction upon further clockwise motion of the dial disc 12, so as to abut against a stop surface 78 formed on an arm 80, also integral with the hub 60 of the cam 59, due to the resilience of the arm 74. The arm 80 is disposed in the same plane as the arms 74 and 76 of the cam 59, but displaced in a clockwise direction therefrom, as seen in FIG. 1, and is adjacent the arm 74; to a free extremity of the arm 80 there is secured an upwardly projecting stop pin 82, the stop pin 82 being employed as a "last digit" stop pin; its operation will be described later. Displaced by about 90° in a clockwise direction from the arm 80 and disposed in the same plane is an arm 84 of the cam 59 which is also secured to the hub 60. At a free extremity of the arm 84, there is disposed an upwardly projecting pin 86, which is an operator stop pin, whose operation will be described later. A ratchet wheel 88, having a hub 90 and 24 teeth, is supported by a shoulder screw 92 to a boss 94. The boss 94 from which there projects a stop 95 extends downwardly from the top side of the housing 14, best seen in FIG. 2, and the ratchet wheel 88 is centered on a line extending from the centerline of the shaft 62 of the dial disc 64 towards the rear of the housing 14, e.g. as seen towards the top of FIG. 1. Above the plane of the ratchet wheel 88, in the position it occupies in FIG. 7, and angularly displaced by about 15° in a clockwise direction about the center of the hub 90 with respect to the line connecting the centers of the ratchet wheel 88 and the dial disc 64, there is disposed an operator stop bar 96 rigidly secured to a spring retainer holder 98, best seen in FIG. 6, which spring retainer holder is also rigid with the ratchet wheel 88; the operator stop bar 96 thus projects radially beyond, and is disposed above the teeth 100 of the ratchet wheel 88, and serves to engage the operator stop pin 86 of the cam 59 on an initial dialing. Also above the plane of the ratchet wheel 88, and about 85° in a clockwise direction from the operator stop bar 96, as viewed from the center of the hub 90, in the position of the ratchet wheel 88 occupied in FIG. 7, there is disposed an operator stop release bar 102, which is rigidly secured to the spring retainer holder 98, and projects radially outwardly from, and is disposed above the teeth 100 of the ratchet wheel 88. The predetermined number of digit stops in the case shown with a ratchet wheel of 24 teeth is set for dialing seven numbers. A stop bar 95 extending downwardly from the boss 94, and best seen in FIGS. 1 and 2, normally limits rotation of the ratchet wheel 88 in a counterclockwise direction. If it is desired to limit dialing to six numbers, the 24 teeth of the ratchet wheel 88 can then be changed to a ratchet wheel having 21 teeth; alternatively, if it is desired to extend the range of dialing, three additional teeth 100 can be added to the ratchet wheel 88 for each additional digit of increased dialing capacity desired. When the predetermined maximum number of digits has been dialed in a clockwise direction, as will be described later, the operator stop release bar 102 cannot pass beyond the stop pin 82 in a clockwise direction, as shown in FIG. 13.

A torsion spring 104 coiled around the boss 90 has one end connected through a hole 106 in the ratchet wheel 88 to the spring retainer holder 98, and its other end secured to the housing 14. The spring 104 may be wound in a clockwise direction, and normally urges the ratchet wheel 88 to turn in a counterclockwise direction, to assume the initial position.

Pivotably connected to the underside of the housing 14, by means of a pivot pin or shoulder screw 108, is a pear shaped pawl 110 having an elongated arm 112 to the left of the pivot pin 108, as seen in FIG. 1. The arm 112, as will be seen later, serves both as an initial position stop arm, and as an operator release arm. A downwardly and upwardly projecting bar 114 extends from the arm 112, being rigidly secured thereto at right angles near an end thereof facing away from the pivot pin 108. A free extremity of a rod 116, which is an extension of the lever 40, best seen in FIGS. 1 and 3, is normally in contact with the bar 114. When the free extremity of the rod 116 is in an upper position, shown in full lines in FIG. 3, a spring 118 maintains the arm 112 in the position shown in full lines in FIG. 1, in which position, as the pawl 110 pivots about the pivot pin 108, the free end of the pawl 110 engages one of the teeth 100 of the ratchet wheel 88. One end of the spring 118 is connected to the arm 112, and its other end is connected to the housing 14 through a hole 120 formed therein, urging the pawl 110 to stay in the aforesaid position. When the free extremity of the rod 116 is in the lower position, as shown in FIG. 3, in dotted lines for example when the receiver-speaker 26 is deposited into the cradle 54, or when the cradle 54 shown in FIG. 1 is manually depressed, then the arm 114 is made to pivot in a counterclockwise direction about the pivot pin 108, as shown in FIG. 1 in dotted lines, in which position the pawl 110 is disengaged from the teeth 100 of the ratchet wheel 88, so as to allow the ratchet wheel 88 to return to its initial position.

As best seen in FIG. 3, when the key 28 is turned in the lock 30 in a counter-clockwise direction, the substantially L-shaped plate 32 rigidly secured to the lock 30 is in the position shown in full lines. In this position an arm 124 of the plate 32 is wedged between a side of the housing 14 of the phone 10, and an inner side face of the bottom housing tray 16 in the vicinity of slot 22, the slot 22 being formed in the housing tray 16. In this locked position the side of the housing tray 16 cannot be pressed inwardly at the location of the arm 124 of the plate 32 to free the flanges 128 and 130 of the housing tray 16 from their snap fit over a ridge 132 projecting from the lower inner edge of the left side of the housing 14, as seen in FIG. 1. While the L-shaped plate 32 is in the position shown in full lines in FIG. 3, the spring 34, which is connected with one of its ends to a lug of the L-shaped plate 32, and with its other end to a lug 33 of the housing 14, is under tension, thus urging the L-shaped plate 32 to turn clockwise as seen in FIG. 3; but the L-shaped plate 32 is prevented from doing so until the lock 30 is unlocked. Now when it is desired to make long distance calls, the key 28 is turned in a clockise direction in the lock 30, causing the plate 32 secured rigidly thereto to rotate to the position shown in dotted in FIG. 3, the relatively thin arm 126 of the plate 32 is made to push against the bar 114 of the arm 112 of the pawl 110 pushing the bar 114 to the right, as seen in FIG. 3, and thus rotating the pawl 110 in a counter-clockwise direction, as seen in FIG. 1 in dotted lines, until the end of the pawl 110 normally engaging the teeth 100 of the ratchet wheel 88 is disengaged therefrom. Simultaneously an arm 122 rigidly secured to the pawl 110 pivots in a counter-clockwise direction about the pivot pin 108, thus pushing against the operator stop release bar 102, which in turn rotates the ratchet wheel 88 in a clockwise direction by about 15°, thus causing the operator stop bar 96 to also rotate by about 15° in a clockwise direction, as the bar 102, the ratchet wheel 88, and the bar 96 form one rigid assembly. This latter position of the operator stop bar 96, i.e. when the key 28 has been turned clockwise, is shown dotted in FIG. 1. A path for the operator stop pin 86 to move past the initial "zero" digit position is now clear. A long distance call can now be made by dialing the operator, or the zero digit. Simultaneously in this unlocked position of the pawl 110, a long distance call requiring the dialing of any number of the numerals 0 through 9 can now be dialed. Each counterclockwise return motion of the dial disc 64 to its initial position causes the thin arm 74 on its counterclockwise return motion to engage with one of the teeth 100 of the ratchet wheel 88, thus turning the ratchet wheel 88 clockwise: the ratchet wheel 88 is thus no longer engaged or held by the pawl 110, and returns to its initial state after each dialing of a single numeral. Thus the phone lock is in the fully unlocked state for dialing local or long distance calls in any manner desired.

Figure 7:
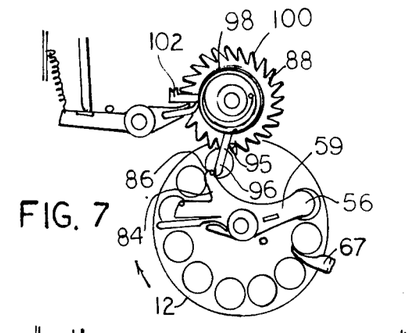
FIG. 7 through 14 show the pawl, the ratchet wheel, and the second dialing means of telephone lock in various operating positions.

In FIG. 1 the housing 14 of the phone lock is shown installed over the phone 10. In FIG. 3 the locked position of the lock is shown, the key 28, of the lock 30 having been turned counterclockwise to the locked position, as shown by the position of the arm 124 in full lines. When the arm 124 is in this position, it is wedged between the left side of housing 10 and the inner surface of the left side of the bottom of the housing tray 16 as shown in FIG. 1, thus locking the phone lock to the conventional phone 10. While the arm 126 of the L-shaped plate 32 is in the position shown by the full lines in FIG. 3, the arm 112 abuts against a stop 136, as shown in full lines in FIG. 1. An arm 122 rigidly secured to the pawl 110, and disposed in a plane above that of the pawl 110, as seen in FIG. 7, serves as an operator release arm, and as an initial position stop arm for the ratchet wheel 88. The spring 118, urges a clockwise motion of the arm 112, as seen in FIG. 1, for it to abut against the stop 136. The ratchet wheel 88 is thus normally restrained from any counterclockwise rotation by one of its teeth 100 abutting against the pawl 110, being urged thereto by the torsion spring 104.

Figures 4, 15:
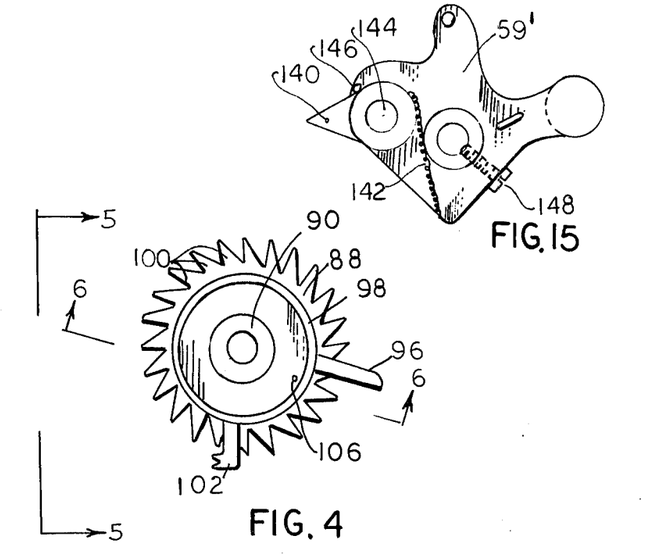
FIG. 4 shows a plan view of the ratchet wheel.
FIG. 15 shows an alternate embodiment of the cam and the ratchet advancement device of the telephone lock.
Figure 5:
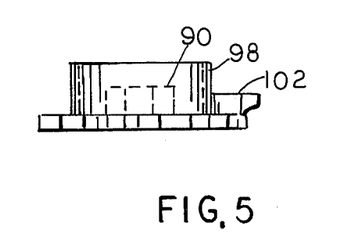
FIG. 5 shows an elevation of the ratchet wheel corresponding to FIG. 4.
Figure 6:
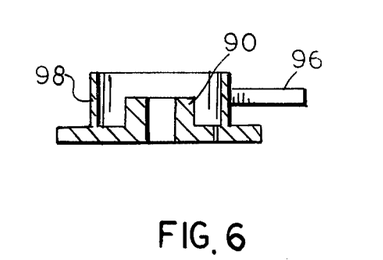
FIG. 6 shows a cross sectional view of the spring retainer holder.

An alternate version of the cam and the ratchet advancement device is shown in FIG. 15. Here a pawl 140 is pivotably mounted on a cam 59′, a tension spring 142 having one end thereof connected to the cam 59′, and its other end connected to the pawl 140, urging the latter to move in a clockwise direction about a shaft 144, rigidly attached to the cam 59′. A stop 146 serves to limit the clockwise motion of the pawl 140. A screw 148 serves to secure the cam 59′ to the shaft 62. It will be seen that in the first embodiment the thin arm 74 serves as the ratchet advancement device, while the combination of the pawl 140 and the tension spring 142 serve as the ratchet advancement device of the above-described, or second embodiment. The function of the combination of the pawl 140 and the tension spring 142 is substantially the same as that of the thin arm 74.

OPERATION

Figure 8:
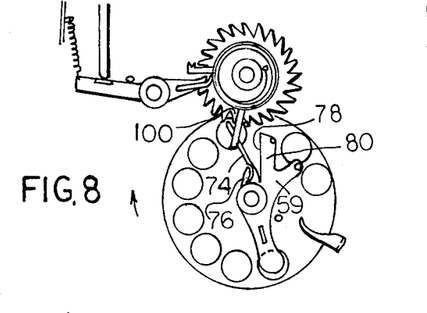
Figure 9:
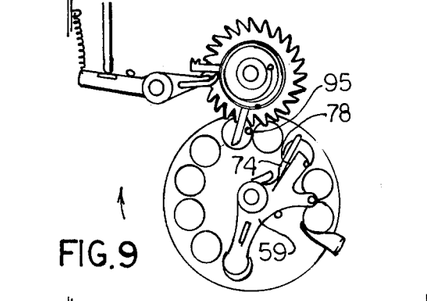
Figure 10:
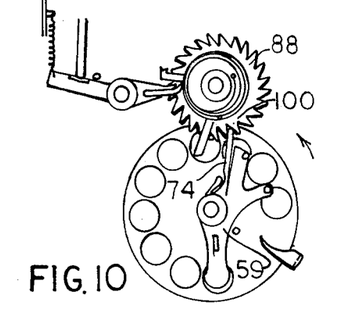

When the phone lock mechanism has been locked, local calls only may be made; but long distance calls, which require either dialing of the number zero to reach the operator, or direct dialing of at least 7 numbers, plus the area code, cannot be made. Referring to FIG. 1, when it is desired to dial the "zero digit," from the initial position shown in FIG. 7, so as to reach the operator, through the dial disc 64, the "zero digit" of the disc 64 cannot be made to rotate to the position of the finger stop 65, as the operator stop pin 86 of the cam 59 will first impinge on the operator stop bar 96 of the ratchet wheel 88, as shown in FIG. 7; the maximum achievable rotation of an initial dialing of the dial disc 64 therefore corresponds to the dialing of the numeral "nine," which can be rotated up to the fingerstop 65, as the dial discs 64 and 12, and the arm 58 rotate as a single unit. Now as the "zero digit" of the dial disc 64 is dialed in a clockwise motion, the thin arm 74 secured also to the hub 60, which arm normally abuts against the stop surface 78 of the arm 80, will then be brushed aside by one of the teeth 100 of the ratchet wheel 88, without engaging therewith, and without being able to turn the ratchet wheel 88, because it will bend at its reduced cross-section, as shown in FIG. 8, and will, upon further dialing, in a clockwise direction, then move in a counterclockwise direction; but at the same time, as the dial disc 12 moves in a clockwise direction, the extremity of the thin arm 74 will subtend a progressively smaller and smaller radius bending over the arm 76, until it will no longer abut one of the teeth 100, but will tangentially pass by the teeth 100 in a clockwise direction. The thin arm 74 will then snap back, and impinge against the stop surface 78 by its own resilient spring action to the position shown in FIG. 9. Next the upwardly pointing operator stop pin 86 on the arm 84 will impinge against the operator stop bar 96 of the ratchet wheel 88, and the dial disc 12 therefore cannot proceed to rotate further in a clockwise direction beyond the position shown in FIG. 7. Neither can the ratchet wheel 88 execute any further counterclockwise rotation, as its operator stop bar 96 is then held against the initial position stop 95 extending downwardly from the boss 94, and best seen in FIGS. 2 and 7. The location of the operator stop pin 86 on the arm 84 permits at most the numeral 9 of the dial disc 12 to abut against the fingerstop 67 upon a clockwise rotation of the dial disc 12, as shown in FIG. 7. Upon completion of the dialing of a first number, and upon the completion of each subsequent dialing the torsion spring 66 (FIG. 2), dial discs 12 and 64 and arms 58, 74, 80 and 84, will return to their initial position in relation to the stop 72 on the arm 58, executing a counterclockwise motion, the stop 72 eventually abutting against the downwardly extending stop 70. When the torsion spring 66 is wound in a clockwise direction, it urges the dialing disc 12 and 64 to return to their initial position in a counterclockwise direction, when the operator's finger is removed from the selected opening for a numeral in the disc 64. Now as the ratchet advancement device, be it, in the first embodiment, the thin arm 74, or in the second embodiment, the combination of the pawl 140, and the tension spring 142, executes the counterclockwise return motion, its free extremity engages one of the teeth 100 of the ratchet wheel 88. (FIG. 10 — shown only for the thin arm 74.)

Figure 11:
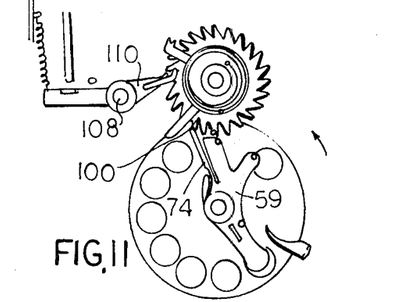
Figure 12:
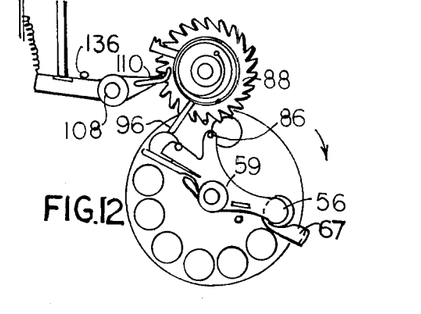

Thus the ratchet wheel 88 is caused to rotate in a clockwise direction by a final displacement angle equal to the angle subtended by two tooth spaces of the teeth 100, as shown in FIG. 11, due to the geometry of the cam 59 (or 59'), the ratchet advancement device, and the ratchet wheel 88. The displacement of the ratchet wheel 88 by an angle equivalent to two tooth spaces after each dialing motion of the dialing disc 64 is, in fact, due to an initial motion of the teeth 100 of the ratchet wheel 88 in a clockwise direction by 2½ spaces, past the tip of the pawl 110, so that one of the teeth 100 of the ratchet wheel 88 can pass completely by the tip of the pawl 110, followed by a counterclockwise, or fall-back motion of the ratchet wheel 88 by ½ space. Thus two of the teeth 100 pass by the curved end of the pawl 110, as seen in FIGS. 11 and 12, taking the pawl 110 partly along, the pawl 110 being free to pivot about the pin 108 in a counterclockwise direction, but being stopped from clockwise rotation by the stop 136, extending downwardly from the underside of the housing 14, as shown for example, in FIGS. 1 and 3; the spring 118, with one end thereof attached to the arm 112 of the pawl 110, and its other end attached to the housing 14, normally urges it to turn in a clockwise direction, as seen in FIG. 1.

As has already been stated, the ratchet wheel 88 is restrained from any counterclockwise rotation, when one of its teeth 100 abut against the pawl 110, being urged thereto by the torsion spring 104. Upon continued dialing, for example upon dialing a second number, whether an attempted dialing of the first number resulted in dialing the number "zero," or any other number from one to nine, it will be seen that the arm 74 will have rotated the ratchet wheel 88 clockwise by 2 and ½ teeth, subsequent to the first dialing, so that the operator stop bar 96 of the ratchet wheel 88 will now have moved in a clockwise direction, and the "zero stop" 86 of the cam 59 will now be free to rotate in a clockwise direction past the operator stop bar 96 of the ratchet wheel 88, making dialing to the position of the fingerstop 67, as shown in FIG. 12, possible. This in turn makes it possible to dial the numeral "zero," when completing a local call for any numeral following the first numeral of a multi-numeral number. However, it will be found that when the seventh numeral, or the last numeral of the predetermined number of numerals is reached, the final digit stop 102 on the ratchet wheel 88 will have reached a position (approximately over the center of the "two digit" opening of the dial disc 12) shown in dotted lines as 102 in FIG. 1, or in full lines in FIG. 13. With the final digit stop 102 in the latter position, the "final number stop" 82 cannot pass the "final digit stop" 102, when any attempt is made to dial a further numeral beyond the predetermined number of numerals permitted to be dialed. Thus, direct long distance dialing is prevented, because of a greater number of digits being required beyond the permitted predetermined number of digits allowed to be dialed.

Figure 14:
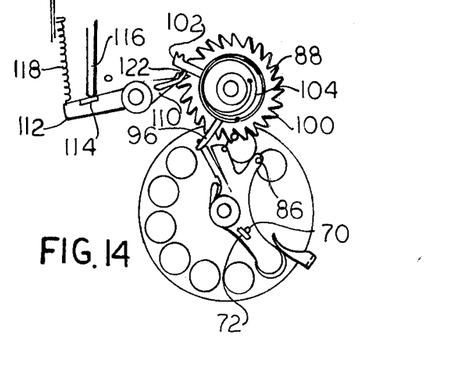

Upon placing the receiver-speaker 26 on the cradle 54, or manually depressing the cradle 54, the cradle 54 moves downwardly. As the rod 116 pivots downwardly (FIG. 14), it abuts against the bar 114 secured to the arm 112. This causes the pawl 110 to pivot in a counterclockwise direction, as seen in FIG. 1, while disengaging its tip from the teeth 100 of the ratchet wheel 88, thus causing the ratchet wheel 88 to initially rotate by a correspondingly small angle in a clockwise direction. When (FIG. 14) the pawl 110 is disengaged from the ratchet wheel 88, the ratchet wheel 88 will rotate in a counterclockwise direction, as it is urged to do so by the torsion spring 104, which latter has been wound up in a clockwise direction. The ratchet wheel 88 comes to rest at its initially assumed position, when the operator stop release bar 102 strikes the operator release arm 122 (FIG. 14). This action resets the mechanism. When the receiver-speaker 26 is lifted from the cradle 54, the reverse of the procedure just described for the pawl 110 takes place, that is the tension spring 118 pulls the arm 112 of the pawl 110 upwardly, thus reengaging the tip of the pawl 110 with one of the teeth 100 of the ratchet wheel 88. To make a long distance call, or to use the phone without any restriction for any predetermined limitation of numerals, can be achieved in the following way. Referring to FIG. 3, when the key 28 in the lock 30 is turned in a clockwise direction, the thin arm 126 of the L-shaped plate 32 of the lock 30 will be in the vertically upwards-pointing position shown in dotted lines. The thin arm 126 is then held in this position by the tension spring 34. In this position the thin arm 126 will have pushed the arm 112 of the pawl 110, which latter is pivotable about the pin 108, in a counter-clockwise direction to a position shown in dotted lines in FIG. 1, carrying with it the arm 122, also shown in dotted lines. The arm 122 in turn will have pushed the operator stop release arm 102 to a position shown in dotted lines in FIG. 1, or in full lines in FIG. 14, thus turning the ratchet wheel 88 by about 15° in a clockwise direction. Thus the elongated stop or the operator stop bar 96 on the ratchet wheel 88 will have turned in a clockwise direction also to a new position, and will therefore no longer restrain the "zero digit" stop bar 86 of the cam 59 from any clockwise motion upon an initial dialing of "zero" on the dial disc 64. Long distance calls can now be made by dialing the operator on any initial dialing. At the same time the tip of the pawl 110 will now be disengaged from the teeth 100 of the ratchet wheel 88. The ratchet wheel 88 will now no longer be restrained from moving from its position it has reached after each digit or numeral of a number having a plurality of digits has been dialed, but will return to its initial position of the operator stop release bar 102 abutting against the operator release arm 122, shown in dotted lines in FIG.

1, or in full lines in FIG. 14. Direct long distance dialing is now possible, as a predetermined limitation of digits or numerals, which can be dialed, no longer exists.

When the arm 124 is in the position shown in dotted lines in FIG. 3, the phone lock assembly can be removed from the phone, if desired, but it need not be removed, when in this unlocked position, for the purpose of making unrestricted calls.

The phone lock of the present invention has been constructed so that it can easily be mass-produced; for example, the majority of parts can be molded from synthetic plastic material. This includes the housing 14, including the stops integral therewith, the finger stop 65, the dial disc 64, the cam 59 and its component parts, the spring retainer housing 68 and the stop projecting therefrom, the ratchet wheel 88 with the operator stop bar 96 and the operator stop release bar 102, as well as the hub 90, the L-shaped plate 32 and its component parts, the bars 36 and 38, the lever 40 and its associated arms, and the pawl 110, including its arms 112 and 122, and the projecting bar 114. The thin resilient arm 74 is best manufactured from synthetic resilient plastic material, such as "Delrin," while all shafts and springs, as well as the lock 30 and the key 28, are best made of metal.

Although the invention has been described with respect to a preferred version thereof, it is to be understood that it is not so limited, since changes can be made therein which are within the full intended scope of the appended claims.

What is claimed is:

1. A telephone lock attachable to a telephone, the telephone having first dialing means, said first dialing means having an initial position for dialing a multiplicity of digits and an operatively hand-held receiver and speaker placeable on a switch, the telephone being in a non-operative state, when said hand-held receiver is placed on the switch, and in an operative state when said hand-held receiver is removed from said switch, the lock permitting a user to dial local calls only, the local calls being dialable with a first predetermined number of digits, the first digit being assigned for calling an operator, in combination comprising:

a housing;

support means connected to said switch and movable from a standby position to an operative position, and connected to said housing for said receiver and speaker to rest upon in said standby position, said standby and operative positions corresponding to said non-operative, and operative states, respectively;

second dialing means having an initial state corresponding to the initial position of the first dialing means, and being connected to the first dialing means for enabling a user to dial a selected number of the digits sequentially upon the receiver and speaker having been lifted from said support means, said second dialing means including a ratchet wheel rotatably mounted on said housing, an elongated arm extending radially from said ratchet wheel;

first dialing stop means for restraining the user form dialing the first digit on said second dialing means for reaching the operator on at least an initial dialing;

counting means for counting the first number of digits, comprising:

a cam rigidly secured to said first dialing means, including ratchet wheel advancement means cooperating with said ratchet wheel;

spring means secured with one end thereof to said housing and with its other end to said ratchet wheel for urging said ratchet wheel to move in one direction, said ratchet wheel being advanceable from an initial position against the action of said spring means by a first preset angle by said ratchet wheel advancement means following dialing of each one of said predetermined number of digits; and second dialing stop means for restraining the user from dialing an additional number of digits beyond said predetermined number of digits upon said ratchet wheel having advanced from said initial position by a second preset angle, said second preset angle being substantially a multiple of said first preset angle, said multiple of said first preset angle corresponding to said first predetermined number of digits, said ratchet wheel advancement means being settable on said cam from a normally occupied first position and first occupied shape to a second position and second occupied shape, and being movable in a predetermined direction when coming in contact with at least a portion of said ratchet wheel upon said dialing means executing a motion in a direction opposite to said predetermined direction by a first prearranged angle to said second position and said second shape, and being arranged to return to said first position and said first shape upon said dialing means having been moved by a second prearranged angle beyond said first prearranged angle in said direction opposite to said predetermined direction.

2. A telephone lock according to claim 1, wherein said ratchet wheel advancement means is movable from a normally occupied first position to a second position, and includes a resilient elongated member secured to said cam, said resilient elongated member being bendable in a predetermined direction when coming in contact with at least a portion of said ratchet wheel upon said dialing means executing a motion by a first predetermined angle in a direction opposite to said predetermined direction to said second position, and being adapted to snap back to said first position upon said dialing means having moved by a second predetermined angle in said direction opposite to said predetermined direction beyond said first predetermined angle.

3. A telephone lock according to claim 2 further comprising lock means having locked and unlocked positions for locking and unlocking said housing to and from the telephone, respectively, and wherein long distance calls and local calls are dialable from the lock-attached telephone in said unlocked and locked positions, respectively.

4. A telephone lock according to claim 3 wherein the operator is callable by initially dialing the digit zero and wherein said first dialing stop means includes zero-dialing stop means having an initial position for restraining the user from dialing the digit zero on the initial dialing, and release means for setting said zero-dialing stop means to an inoperative position.

5. A telephone lock according to claim 1, further comprising resetting means for resetting said second dialing means to said initial state upon the receiver and speaker having been replaced on said support means.

6. A telephone lock according to claim 5, wherein said resetting means has an initial state and includes:
a stop disposed on said ratchet wheel; and
pivotable means operable by said support means and connected to said housing for operatively making contact with said stop, and for restraining said ratchet wheel from motion beyond a preset angle in a direction urged on said ratchet wheel by said spring means upon said receiver and speaker having been placed on said support means, whereby said resetting means is reset to said initial state.

7. A telephone lock according to claim 6 wherein said second dialing stop means includes a last digit stop means disposed on said cam for abutting said stop disposed on said ratchet wheel upon said ratchet wheel having been advanced from said initial position by said preset angle so as to restrain the user from dialing said additional number of digits.

8. A telephone lock according to claim 6 wherein said pivotable means engages said ratchet wheel so as to restrain the latter to move in a direction opposite to the direction urged upon said ratchet wheel by said spring means when said lock means is in said locked position, and wherein said lock means cooperates with said pivot means for disenaging said pivot means from said ratchet wheel when said lock means is in said unlocked position.

9. A telephone lock according to claim 7 wherein said first dialing stop means includes first operator stop means rigid with said ratchet wheel and wherein said cam includes second operator stop means secured thereto for said second operator stop means to abut said first operator stop means, so as to restrain the user from dialing said at least one of the digits.

10. A telephone lock according to claim 9, wherein said support means include a cradle, said pivotable means include a pawl, and wherein said cradle, said pawl, said housing, said cam, said stop and said operator stop means are made of synthetic plastic material, said resilient elongated member is made of synthetic resilient plastic material, and said spring means is made of metal.

11. A telephone lock according to claim 1, wherein said ratchet wheel advancement means includes an arm pivotably secured to said cam, and a tension spring attached with one end thereof to said cam, and with the other end thereof to the pivotably secured arm.

* * * * *

UNITED STATES PATENT OFFICE
CERTIFICATE OF CORRECTION

Patent No. 4,139,741  Dated Feb. 13, 1979

Inventor(s) Austin R.Q. Kennedy

It is certified that error appears in the above-identified patent and that said Letters Patent are hereby corrected as shown below:

Page 1, Col.1, item [56], please add: -- 4,022,992 5/1977 Kennedy 179/90 D --; Col.2, below "Assistant Examiner - Gerald L.Brigance" add: -- Attorney,Agent or Firm -- Erwin S.Teltscher --; line 9, delete "-"; line 48, change "ratched" to -- ratchet--; line 68, change "normal" to--normally--; Col.3,line 34, change "abuting" to -- abutting --; line 12, change "preferrably" to -- preferably--Col.4,line 6, change"." to --:--; line 8, change "." to --;--; Col.5, line 15, change "64" to --65--; line 33, following "60" add --,--; Col.7, line 60, delete","; Col.9, line 20, delete","(2nd occurrence). Column 9, line 6, "67" should read --65--.
Sheet 5 of 5, Fig. 7, change "67" to --65--; Fig. 12, change "67" to --65--.

Signed and Sealed this

Twenty-first Day of August 1979

[SEAL]

Attest:

Attesting Officer

LUTRELLE F. PARKER

Acting Commissioner of Patents and Trademarks